United States Patent [19]

Booty

[11] 4,094,785
[45] June 13, 1978

[54] SUCTION CLARIFIER METHOD

[75] Inventor: William Michael Booty, Corvallis, Oreg.

[73] Assignee: Neptune Microfloc, Inc., Corvallis, Oreg.

[21] Appl. No.: 735,381

[22] Filed: Oct. 26, 1976

[51] Int. Cl.$^2$ ............................................. B01D 21/24
[52] U.S. Cl. ....................... 210/70; 210/527; 210/532 S
[58] Field of Search ............... 210/169, 242, 197, 523, 210/527, 416, 533, 70, 532; 137/124, 125, 126, 127, 128

[56] References Cited

U.S. PATENT DOCUMENTS

| | | | |
|---|---|---|---|
| 1,023,359 | 4/1912 | Birrell | 137/128 X |
| 1,274,578 | 8/1918 | Nicholson | 137/128 |
| 2,184,025 | 12/1939 | Smith et al. | 137/128 |
| 3,304,564 | 2/1967 | Green et al. | 210/169 X |
| 3,333,704 | 8/1967 | McGivern et al. | 137/124 X |
| 3,693,798 | 9/1972 | White | 210/169 |
| 3,709,792 | 1/1973 | Hampton | 210/197 |
| 3,771,544 | 11/1973 | Horvath | 210/169 |
| 3,797,664 | 3/1974 | Pentz et al. | 210/527 |
| 3,993,568 | 11/1976 | Fux | 210/527 |

Primary Examiner—Theodore A. Granger
Attorney, Agent, or Firm—Klarquist, Sparkman, Campbell, Leigh, Hill & Whinston

[57] ABSTRACT

A self-cleaning siphon-type method for removing sludge from a water or liquid waste settling tank is disclosed. A siphon conduit, through which liquid flows from the settling tank into an adjacent chamber which contains liquid at a level lower than the level in the tank, is provided along with means for withdrawing liquid from the chamber at a constant, predetermined rate. Momentarily decreased flow through the siphon tube due to clogging the siphon conduit inlets results in a lowering of liquid in the chamber and increased suction in the conduit, which increased suction tends to unclog the siphon conduit inlets.

1 Claim, 2 Drawing Figures

SUCTION CLARIFIER METHOD

BACKGROUND OF THE INVENTION

The present invention relates to a siphon-type method for removing sludge from a water or liquid waste settling tank and more specifically to a system in which flow through the siphon remains substantially constant.

In prior art siphon type sludge removal systems, e.g. McGivern U.S. Pat. No. 3,333,704, sludge is removed from the bottom of a sewage settling tank by a siphon in which a constant suction is maintained even when the siphon inlets become clogged so that flow through the siphon is reduced. Because the suction remains constant, the inlets of such prior systems tend to remain clogged and flow through the siphon continues to diminish.

SUMMARY OF THE INVENTION

The present invention is a siphon arrangement for removing sludge from the bottom of a water or liquid waste settling tank and discharging it into a sludge tank from which it is removed at a constant rate. The siphon is constructed such that the suction is determined by the level of the sludge in the sludge tank. This level will raise or lower depending upon flow through the siphon because sludge is removed from the sludge tank at a constant rate. If the inlets to the siphon become clogged, flow through the remaining unclogged orifices increases, but the total flow through the siphon is momentarily reduced due to the increased headloss across the unclogged orifices. As a result of this momentary reduction, the distance between the surface of the liquid in the sludge tank and the surface of the liquid in the settling tank increases. This increase in head causes increased suction inside the siphon conduit which restores the original total flow rate and in most cases forcibly clears the clogged inlets. The self-cleaning action of the improved siphon eliminates flow fluctuations and the need for frequent back flushing or other disadvantageous procedures for cleaning the inlets.

DESCRIPTION OF THE PREFERRED EMBODIMENT

Figure 1:
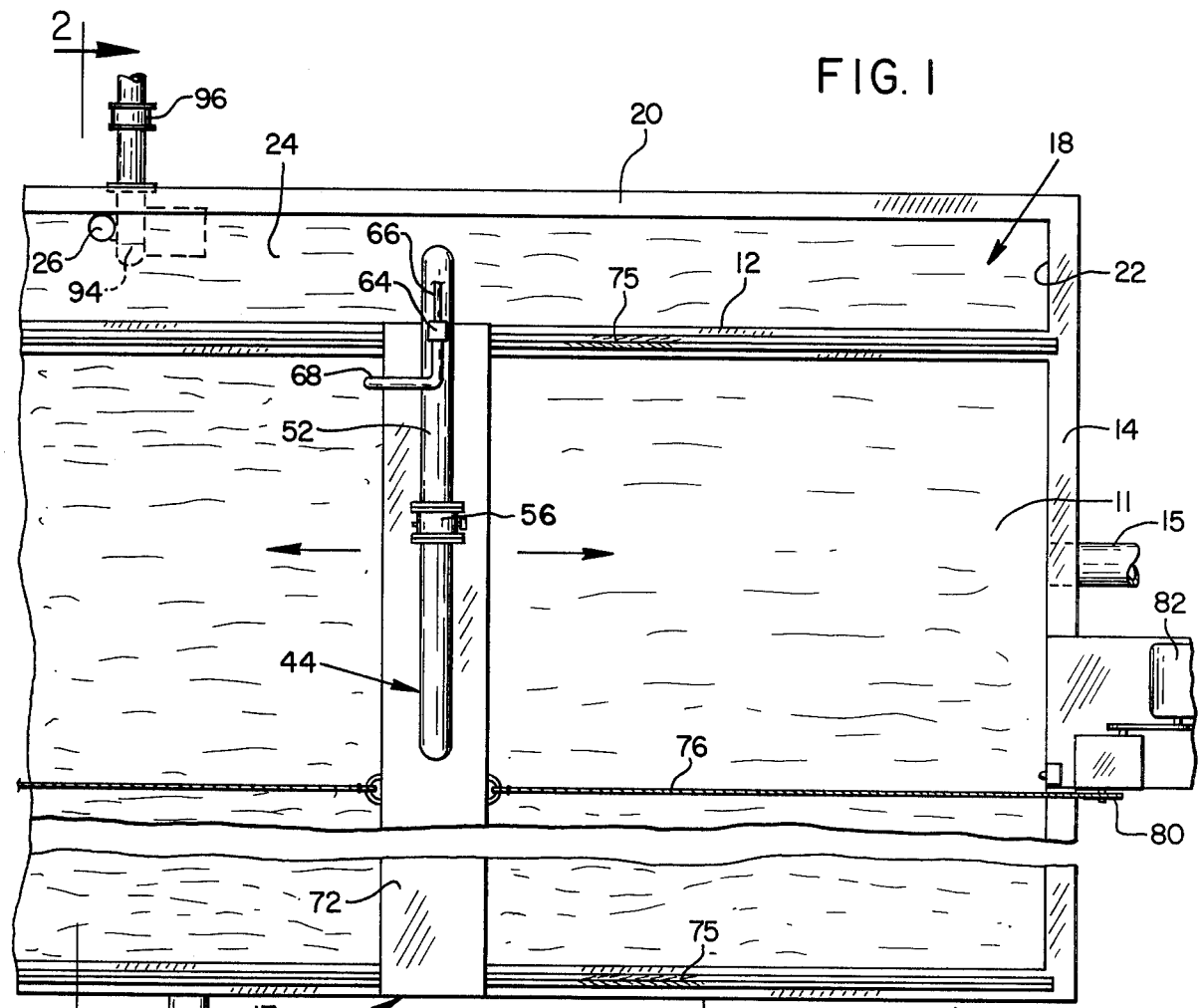
FIG. 1 is a schematic plan view of a tank equipped with a siphon sludge removal system in accordance with the present invention.
Figure 2:
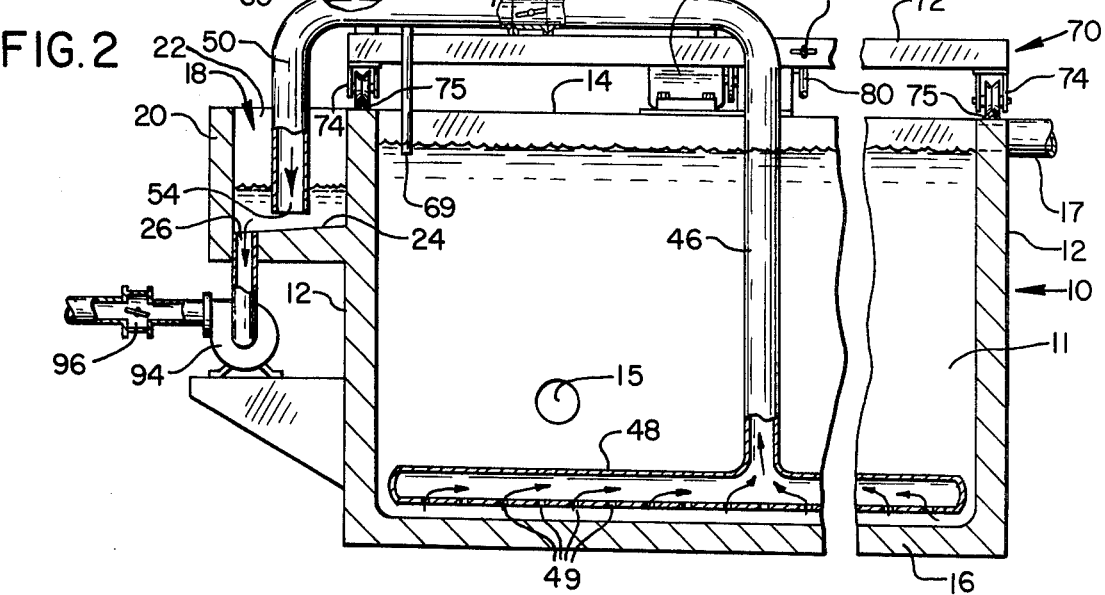
FIG. 2 is a sectional view taken on line 2—2 of FIG. 1.

Referring to the drawings, the preferred embodiment of the present invention includes an elongated water or liquid waste receiving tank 10 which defines a settling chamber 11. The tank has vertical side walls 12, opposed end walls 14 and a bottom 16. The tank is provided with an inlet 15 for water or liquid waste and an outlet 17 through which clarified or partially clarified liquid is discharged. The rates at which liquid flows through the inlet and outlet are adjusted such that liquid in the tank 10 is maintained between two predetermined levels which are a few inches apart.

A second chamber or sludge tank is associated with the tank 10 and, as illustrated, is preferably an upwardly opening trough or channel 18 which extends the full length of the tank along one side wall 12 and adjacent the upper edge thereof. This channel may have one of its side walls formed by the adjacent side wall 12 of the tank and another upright side wall 20 extending longitudinally and parallel to the side wall 12 and spaced laterally, outwardly thereof. The ends are closed at 22. The bottom 24 is located below the predetermined level of liquid in the tank 10. Other sludge chamber arrangements may be provided so long as the sludge chamber is out of communication with the settling chamber, and it is possible for the level of liquid in the sludge chamber to be lower than the level of the liquid in the settling chamber.

A siphon, indicated generally by the numeral 44, is provided for removing the sludge from the bottom of the settling chamber 11. The siphon 44 comprises a conduit including a siphon header pipe 48 which is horizontally disposed and located just above the bottom 16 of the tank and which is provided with downwardly opening sludge inlets 49 spaced along its length, through which sludge may be drawn into the siphon. The siphon header pipe 48 extends over the width of the bottom 16 so that sludge will be removed from the full width of the bottom 16. A vertically disposed pipe 46, connected to the siphon header pipe 48, extends upwardly to a height greater than the wall 12. A laterally extending pipe section 52 connects the pipe 46 with a vertically disposed pipe 50 which extends downwardly into the trough 18. The lower extremity of the depending pipe 50 provides a siphon outlet 54 which is below the level of the liquid in the trough 18. A valve 56 may optionally be included at some point in the siphon conduit to regulate the flow rate through the conduit. With this arrangement, sludge is removed from the tank 10 by means of a siphon action as it accumulates on the bottom 16 of the tank 10.

The siphon 44 may be started or primed by applying a vacuum inside the conduit. In the illustrated embodiment this is accomplished by a priming mechanism which includes a priming line 60 communicating with the interior of the lateral pipe section 52, a priming valve 62 in the priming line 60, an eductor 64 for introducing the contents of the priming line into a stream of water delivered through a water inlet conduit 66, and an outlet conduit 68 extending from the eductor, into the chamber 11 and terminating in an outlet 69. To prime the siphon with this mechanism, the sludge inlets 49 and siphon outlet 54 must be submerged and the priming valve 62 opened. A stream of water is pumped from the inlet conduit 66 through the eductor 64 thereby creating suction inside the siphon conduit. This suction draws liquid up through the inlets 49 and outlet 54 until the siphon is entirely filled with liquid. Once the conduit is filled, the valve 62 is then closed to prevent air from entering the siphon conduit through the priming line 60. Siphon action commences when sludge is withdrawn from the sludge tank.

The siphon is supported on a carriage 70 comprising a flat platform 72 which extends transversely the full distance between the side walls 12. Means are provided whereby the carriage 70 is supported by the side walls 12. In the illustrated embodiment, the platform 72 is supported on casters 74 attached respectively to its opposite ends. The casters ride back and forth on rails 75 which are fixed on the side walls 12. Flotation devices may, be used as an alternative means for supporting the carriage 70 if desired.

The carriage is operably connected to suitable drive means for movement longitudinally the full length of the tank. The drive means may take the illustrated form wherein the ends of a cable 76 are attached at the front and back edges of the platform 72 and the cable looped around an idler sheave (not shown) which is mounted on the upper edge of one of the end walls and around a driven pulley 80 which is mounted adjacent the upper edge of the other end wall 14. The pulley 80 is driven by a suitable electric motor 82 which is preferably of the variable speed, reversible type, controlled by a suitable circuit.

While in operation, the siphon 44 is moved along with the carriage 70 from one end of the tank to the other at a speed selected in accordance with the rate of deposit of the sludge on the bottom 16 of the tank. The pipe 50 moves along in the trough 18 and the siphon header pipe 48 moves from end to end of the tank bottom 16. The sludge, which is a viscous liquid, will be drawn up through the inlet openings 49 by suction inside the siphon 44 and be discharged from the siphon outlet 54 as it moves along the sludge trough 18.

It is important to constant withdrawal and the proper self-cleaning operation of the siphon that the level of the liquid in the chamber 18 be free to vary independently of the level of the liquid in the settling chamber 11 and that sludge be continuously removed from the trough 18 at a constant rate. Discharge of sludge from the trough 18 is controlled by a discharge means which maintains a constant flow of liquid through the discharge outlet 26 so long as there is liquid present in the chamber 18. In the illustrated embodiment, the discharge means includes a pump 94 of any suitable design and a flow control valve 96 for regulating the flow of liquid out of the chamber 18. There are, however, several alternative discharge means which would serve equally as well. The pump 94 may be eliminated in cases where the liquid will flow through the discharge outlet 26 by gravity and the flow rate can be held constant by the valve 96. If the pump 94 is a variable speed pump with a suitable mechanism for controlling the speed of the pump, the flow valve 96 may be eliminated. Numerous other mechanisms would be apparent to one skilled in the art for maintaining a constant flow of sludge through the discharge outlet 26.

During operation of other siphon type sludge removal systems, flow through the siphon conduit 44 decreases if the siphon inlets become clogged. In the present invention sludge continues to be removed from the sludge trough 18 at a constant rate and thus any such flow decrease is only momentary because the level of the liquid in the sludge trough 18 drops when flow through the siphon 44 is reduced. The resulting increase in differential between the levels of the liquids in the chamber 11 and the sludge trough 18 causes increased suction in the siphon which restores the original steady flow of liquid into the trough 18 and in most instances is sufficient to forceably unclog the inlets 49. Under extreme conditions the inlets 49 might become so badly clogged that the increased suction inside the siphon conduit would not forceably clean them. If such were the case, the discharge means would empty the channel 18 so that air could enter the siphon conduit through the outlet 54 and thereby break the continuity of liquid inside the conduit. Such exteme conditions are unusual, however, and would require operator attention in any event.

While I have shown and described a preferred embodiment of my invention, it will be apparent to those skilled in the art that changes and modifications may be made without departing from my invention in its broader aspects.

I claim:

1. A method for unclogging inlets of a siphon conduit used for discharging sludge from the bottom of a liquid clarification settling tank into an adjoining chamber and for maintaining a substantially constant flow of liquid through a siphon conduit having inlets subject to clogging comprising:

causing a stream of liquid waste to flow into and a stream of clarified liquid to flow out of a settling tank at rates set to maintain the surface of liquid in said settling tank substantially at a predetermined level;

producing a flow of sludge by siphon action from the bottom of said tank into an adjoining chamber through a conduit having a plurality of inlets subject to clogging;

removing sludge from said adjoining chamber at a fixed rate greater than the maximum rate of which sludge can flow through said conduit when one or more of said inlets are clogged and less than the maximum rate at which sludge can flow through said conduit when all of said inlets are unclogged so that when one or more of said inlets are clogged, the level of liquid in said adjoining chamber at least momentarily drops to a level below the level at which liquid is maintained when all inlets are unclogged and the vertical distance between the levels of the liquids in the two chambers increases to an amount greater than the amount maintained when all said inlets are unclogged thereby creating a greater amount of suction inside said conduit then is present when all said inlets are unclogged thus to urge the clogging material through the clogged inlet and into said conduit; and maintaining said fixed rate of sludge removal from said adjoining chamber indefinitely until such time as all liquid is removed therefrom.

* * * * *